United States Patent [19]
Brodefors et al.

[11] Patent Number: 5,181,532
[45] Date of Patent: Jan. 26, 1993

[54] FLOW CONTROL

[76] Inventors: Lage Brodefors, Terrassgatan 15, S-411 33 Göteborg; Lars Irstam, Lilla Askimsvägen 6, S-436 00 Askim, both of Sweden

[21] Appl. No.: 871,837

[22] Filed: Apr. 20, 1992

Related U.S. Application Data

[63] Continuation of Ser. No. 674,364, Apr. 16, 1991, abandoned.

[30] Foreign Application Priority Data

Sep. 16, 1988 [SE] Sweden .................. 8803272

[51] Int. Cl.$^5$ .............................................. G05D 7/01
[52] U.S. Cl. ........................................ 137/14; 138/42; 138/44
[58] Field of Search ................. 138/41, 42, 44, 45; 137/40, 1, 14

[56] References Cited

U.S. PATENT DOCUMENTS

| | | | |
|---|---|---|---|
| 3,490,561 | 1/1970 | Colgan | 138/42 X |
| 3,792,609 | 2/1974 | Blair | 138/41 X |
| 4,062,424 | 12/1977 | Lyden | 138/42 X |
| 4,393,651 | 7/1983 | Peck | 60/39.28 |
| 4,422,339 | 12/1983 | Gall | 138/44 X |
| 4,858,643 | 8/1989 | Vavra | 137/486 |

FOREIGN PATENT DOCUMENTS 3639161  6/1987 Fed. Rep. of Germany.
1492508  7/1987 France.

*Primary Examiner*—Alan Cohan
*Attorney, Agent, or Firm*—Ostrolenk, Faber, Gerb & Soffen

[57] ABSTRACT

Using conventional manufacturing methods, porous, sintered, compacted powder bodies shaped as straight cylinders can be produced with extremely small variations in their flow resistance to a fluid. According to the invention, such bodies are produced in series so that, for a certain fluid and a certain pressure drop above the body, they produce a predetermined flow which can easily be regulated by using simple pressure-regulating equipment for controlling the pressure drop. The invention comprises an apparatus consisting of a pipe with pressure-regulating means, a container for a body according to the invention, and a series of bodies with different flow resistance for setting different flow intervals in the pipe for given fluids. The invention also comprises a method for setting a predetermined flow for a specific fluid at a given pressure, and the use of well defined porous bodies enabling a desired pressure to be set by regulating the pressure drop across the body.

6 Claims, 1 Drawing Sheet

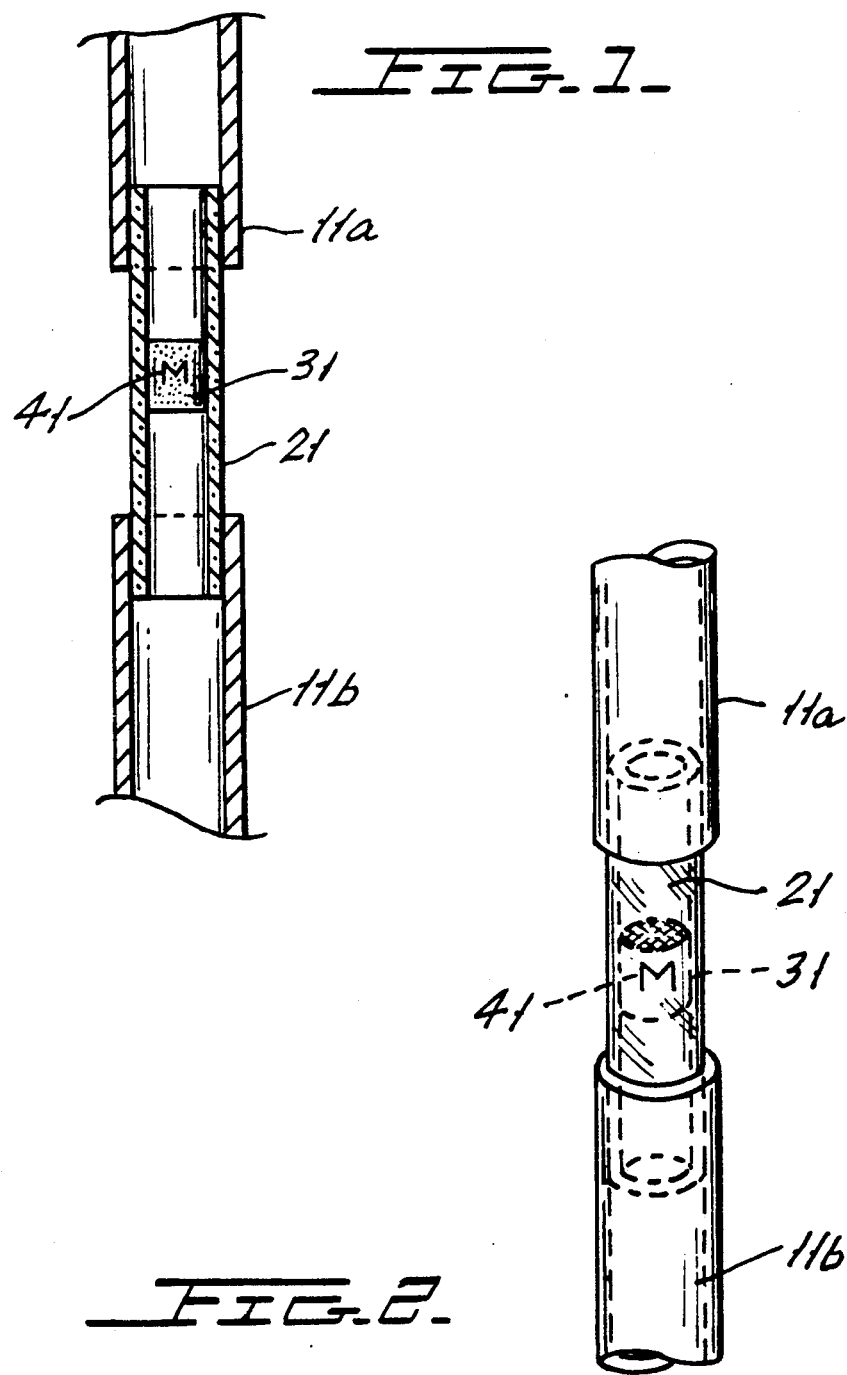

FLOW CONTROL

This is a continuation of application Ser. No. 07/674,364, filed Apr. 16, 1991 now abandoned.

The method according to the invention serves to set a specific flow for a specific fluid flowing through a pipe, and the method is characterised by causing the fluid to flow through a porous body having predetermined flow resistance characteristics, and being selected to permit a through-flow in the desired flow interval, and also by setting the specific desired flow by adjusting the fluid pressure drop across the body.

It has proved possible to produce porous bodies for performing the method, these bodies having predictable fluid through-flow characteristics and, using conventional methods, a series of bodies of this type can be mass-produced which have almost identical fluid through-flow characteristics. This enables a desired flow to be obtained without calibration of the like, using the method according to the invention.

One embodiment of the method comprises prefabricating various series of porous bodies having fluid through-flow characteristics, carefully predetermined within each series, designed to produce a predetermined flow for a specific fluid and a predetemriend fluid pressure difference above the body.

The method according to the invention also entails the advantage that many impurities in the fluid can be filtered out by the body. If the body becomes clogged by such impurities, this will result in the flow being restricted which in most applications is an advantage, if any deviation from rated flow appears.

The method according to the invention also permits the use of one body for each occasion, i.e. the bodies are of disposable nature. The various series of bodies can thus be provided with markings corresponding to a certain flow interval. Furthermore, the container in which the body is to be placed may be transparent to enable the marking on the body to be inspected after insertion in the container. The container is naturally inserted in the pipe through which the fluid is flowing, its two ends suitably being joined to respective parts of the pipe, and a casing tightly sealed of the causing of the body, thus causing the fluid to flow through the body in predetemriend manner.

The method as claimed is also based on the realization that prous bodies having all the properties mentioned above can be produced by sintering a compacted body made from a suitable powder. A sintered body of stainless metallic powder is thus suitable and conventional methods of manufacturing such bodies give very slight variations in the flow characteristics for each type of body. It has been found, for instance, that sintered compacted bodies made of powder from stainless billets (e.g. steel or titanium) have predictable properties at compacting and sintering, which are suitable and conventional of the materials in question. It has thus been found that a standard deviation curve with substantially vertical flanks can be obtained in the bodies, indicating that the characteristics in the bodies are extremely similar.

These porous bodies are manufactured in extremely clean surroundings and can easily be sterilized.

The bodies do not release any free particles which can be flushed away by the fluid flowing through them.

The porous bodies may advantageously be shaped as straight cylinder. It is of course desirable for the flow distribution to be constant across the fluid through-flow cross section of he body and it is relatively simple to achieve this by suitably chosen geometry for the body and suitable compacting conditions.

An embodiment of this invention is explained in the following description of the accompanying drawings in which:

FIG. 1 is a cross-section of flow-control apparatus constructed in accordance with this invention and fitted into a pipe;

FIG. 2 is a perspective of the apparatus of FIG. 1.

Apparatus constructed according to this invention for setting a desired flow for a specific fluid flowing through a pipe 11a, 11b, is as illustrated in FIGS. 1 and 2. Such apparatus is characterized by transparent container 21 and porous body 31 that controls s the flow of fluid through container 21. The latter is constituted by transparent stub tube 21 that interconnects aligned pipe parts 11a, 11b. Body 31 is cylindrical and is inserted into container 21, said body 31 having predetemriend fluid through-flow characteristics and permits the pressure difference across the body 31 to be regulated to thereby set a predetermined flow. Container 21 is sealed against the mantle of body 31. In a preferred embodiment the porous body 31 is a sintered compacted of powder, particularly stainless metallic powder. The body is suitably of disposable nature and it is therefore advantageous to bear able with simple means to produce a series of bodies with predetermined flow-resistance characterised, all the bodies in practice having almost identical through-flow characteristics, so that the pressure can be sued as control magnitude to set a predetermined flow, particularly without any calibration of the bodies. The apparatus may thus include at least two series of bodies, the bodies in each group having substantially constant flow characteristics and the bodies in the various groups having different and predetermined flow characteristics. The bodies are suitable provided with markings 41 corresponding to their flow characteristics.

The invention also encompasses the use of porous bodies with swell defined flow-resistance characteristics, offering simple control of fluid flowing through them, by means of pressure-control equipment.

The invention can be described by stating that, thanks to its properties, the prous body determines the size of the flow due to the pressure drop over the body. The flow can thus be controlled, using relatively simple means to controls the pressure, provided the porous bodies are manufactured having identical fluid through-flow characteristics, particularly bodies having flow characteristics which can be predetermined.

This method gives exeteremenly high flow-control precision and a lower limit of about $1 \times 10^{-8}$ cm$^3$/sec may be stated as a sort of limit value for gas control. In this case the bodies are normally a few along and have a diameter of 3-8 mm.

For porous bodies of approximately the same dimensions intended for measuring out liquids, limit values for liquids similar to water, for instance, may be stated as 0.5-5 cm$^3$/min. However, considerably higher values can of course be achieved depending on the choice of powder sintered.

It is not necessary to use stainless steel in the sintered bodies, both this is often preferably for technical reasons and reasons of cost. Titanium is the alternative and this may be preferred if sterile porous bodies are required.

The limit values stated above are entirely dependent on the pressure and fluid properties. However, these values are applicable as limit value for dosing equipment used so far.

When being used for gas, the bodies may e provided with a sealing casing, ensuring that the flow will pass axially through the whole body. When being used for liquid, the seal between the casing of the body and the surroundings (chamber wall of the like) is more efficient and the sintered bodies can therefore be used as they are.

When manufacturing bodies according to the invention, predetermined porosity can be produced with great certainty if a specific fraction or distribution of grain size is used. Compacting the powder bodies will then result in a specified porosity within wide compacting pressure limits (e.g. up to about 4000 bar) and under normal sintering conditions for the material selected.

Bodies according to the invention may be cylindrical in shape with a length of about 3-6 mm and a diameter of about 3-6 mm.

A cylindrical body with diameter 6 mm, length 4 mm and porosity about 2 micron, using a glucose solution (Ringer-solution() will give a through-flow of 1.4-28 cc/min at a pressure drop of 100 cm water column. A flow of up to 60 cc/min was obtained in some tests. In general it can be stated that bodies according to the invention having diameter 3-6 mm and length 3-6 mm produce a gas through-flow int h region $10^2$–$10^{-8}$ cc/sec, or a liquid flow-through of 1-50 cc/min for a liquid equivalent to water. The bodies can be used to advantage as main components in simple, robust new designs for dosing equipment. The complicated dosing pumps currently used for dosing insulin, cytotoxins, etc. can therefore perhaps be entirely avoided.

The bodies can also be used, for instance, for supplying gas to liquid, e.g. for oxygenating liquid ($O_2$ to water in fish farms).

We claim:

1. A method of setting an adjustable flow for a specific fluid flowing through a pipe, by arranging an exchangeable porous body having predetemriend liquid through-flow characteristics in a container coupled to the pipe, said container corresponding to the body, the method comprising the steps of prefabricating various series of porous bodies having various fluid through-flow characteristics, providing the various series of bodies with marking corresponding to a certain maximum flow, the container being transparent to enable the marking on the body to be inspected after insertion in said container.

2. A method as claimed in claim 1, wherein the bodies are compacted and sintered bodies made from granular material.

3. A method as claimed in claim 2, wherein the bodies are made of sintered, stainless metal powder.

4. An arrangement for setting a predetermined flow for a specific fluid flowing through a pipe, comprising a porous body exchangeably arranged in a transparent container coupled to the pipe, said body being selected from a group of porous bodies prefabricated in various series, the bodies of each series having substantially constant flow-resistance characteristics and each being provided with a marking corresponding to its flow characteristics.

5. An arrangement as claimed in claim 4, wherein the bodies are compacted and sintered bodies produced from granular material.

6. An arrangement as claimed in claim 5, wherein the porous body is a sintered compacted body of a stainless metallic powder.

* * * * *